March 4, 1969     SEIICHI MAKITA     3,431,006

DETACHABLE HANDLE APPARATUS FOR CASSEROLE DISHES OR THE LIKE

Filed Sept. 8, 1966

United States Patent Office 3,431,006
Patented Mar. 4, 1969

3,431,006
DETACHABLE HANDLE APPARATUS FOR CASSEROLE DISHES OR THE LIKE
Seiichi Makita, Nagoya-shi, Aichi-ken, Japan, assignor to Nippon Toki Kabushiki Kaisha, Nagoya-shi, Aichi-ken, Japan, a corporation of Japan
Filed Sept. 8, 1966, Ser. No. 577,904
Claims priority, application Japan, May 27, 1966, 41/48,903
U.S. Cl. 294—31
Int. Cl. A47j 45/10
5 Claims

ABSTRACT OF THE DISCLOSURE

A detachable handle apparatus for connection with an object having an integral extension extending therefrom, said handle apparatus including a handle portion which is secured with respect to the extension by means of a clamping member pivotally connected with respect to the handle portion and adapted to be cammed into a locking engagement with the extension by means of a locking lever connected with respect to said handle portion for pivotal movement in a horizontal plane.

---

The present invention relates to a detachable handle apparatus for casserole dishes or the like and more particularly to a locking means adapted to detachably secure the handle apparatus to an ear member or an integral extension provided at the edge of a casserole dish or the like.

In cooking foods using an oven, it is necessary to use a handle for removing a heated casserole dish or the like from the oven without touching it with the hand. If the handle is permanently fixed to the casserole dish or the like, however, it provides an obstacle to the insertion of the casserole dish in an oven. In this view, various handle apparatus have been proposed for the purpose described, which are adapted to be attached to a casserole dish or the like removably. Examples of such handle apparatus are those disclosed, for example, in U.S. Patent No. 3,065,016 to A. W. Serio, dated Nov. 20, 1962, and entitled, "Detachable Handle Apparatus," and in U.S. Patent No. 3,065,017 and U.S. Patent No. 3,065,018, all entitled the same.

These detachable handle apparatus of the conventional types include, as a locking means for securing the handle apparatus to a casserole dish, means comprising a clamping element pivotally connected to the handle apparatus in the proximity of the inner end thereof and an axially extending shaft adapted to be operated at the outer end of the handle apparatus to engage said clamping element with an ear member or an integral extension outwardly extending from the side of the casserole dish. With the means described, rotation of the shaft, for example, about the longitudinal axis of the handle apparatus pushes the clamping element forward at one end by an actuating member provided at the inner end thereof, causing the other end of the said clamping element to be pressed against the integral extension of the casserole dish, whereby the handle apparatus is locked with the casserole dish.

Such handle apparatus of the conventional type, however, have the inconvenience that the operation of the handle apparatus required both hands, i.e. one hand for holding the main body of the handle apparatus and the other hand for operating a knob provided at the outer end of the shaft.

Another disadvantage of such handle apparatus is that, since the shaft for the actuation of the clamping element extends through the main body of the handle apparatus, it is impossible to clean all of the movable parts in said apparatus satisfactorily and as a result there remains the fear that the operation of the shaft would be impaired by foreign matters possibly attached thereto during the use of the handle apparatus.

The present invention has been achieved with a view to eliminate the aforementioned drawbacks of the conventional handle apparatus and, therefore, has for its primary object to provide a detachable handle apparatus which can be operated with a single hand.

Another object of the present invention is to provide a detachable handle apparatus which is simple in construction and which can be readily cleaned so as to preclude possible malfunction of the handle apparatus.

The present invention will be illustrated in further detail with reference to the accompanying drawings, in which:

FIGURE 1 is a plan view of the handle apparatus of the present invention in engagement with a casserole dish or the like;

Figure 1:
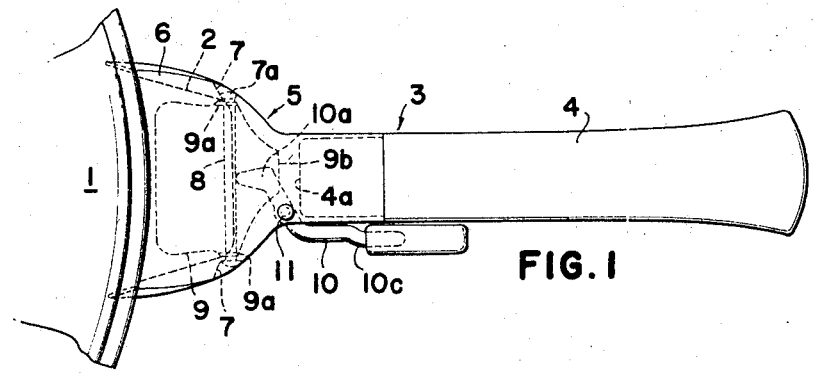

Referring now to the drawings, reference numeral 1 generally indicates a casserole dish to be clamped by the handle apparatus of the present invention, which casserole dish is provided at the peripheral side thereof with an ear member or an integral extension 2.

The handle apparatus of the invention, which is generally indicated by reference numeral 3, is composed of a handle grip member 4 and a clamping member 5, and said clamping member 5 consists of a main body 6 and a neck which is stuck into the inner end of the handle grip member 4. The end of the main body 6 has a curved configuration conforming to the contour of the side wall of the casserole dish 1. In both side walls of the main body 6 of the clamping member there are formed recesses 7 in opposed relation and the bottoms of said recesses 7 provide a pair of opposite walls 7a for supporting a pivot pin 8. The pivot pin 8 is fixed on said walls 7a at both ends by a suitable means and a clamping element 9 is mounted on said pin 8 for pivotal movement, by means of which the handle apparatus is connected to the casserole dish.

Figure 2:
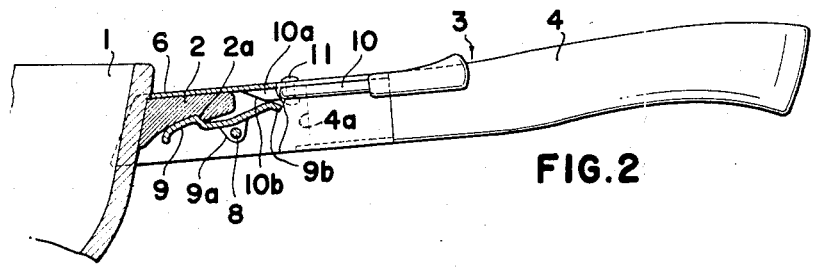
FIGURE 2 is a side view of FIG. 1 with a portion shown in section.

The clamping element 9 is supported on the pin 8 by way of flange 9a provided at both ends thereof and a section of said clamping element 9 closer to the inner end extremity of the handle apparatus 3 has a convex curved cross section, as shown in FIG. 2, for engagement with a shoulder 2a which is formed at the outer end portion of the integral extension 2 extending from the casserole dish 1.

A lock lever 10 is pivotally connected to the upper wall of the main body 6 by means of a pivot pin 11 at a location approximating the handle grip member 4, one end 10a of said lever being bent in a hook-like shape and the under surface of said bent portion sloping upwardly towards the tip end so as to provide a cam surface 10b. The other end portion 10c of the lock lever 10, that is the portion at which said lever is operated by the hand, is bent in an opposite direction to the hook-shaped end 10a, so that when the lock lever 10 is in a locked position, the portion 10c of the lever is arranged substantially parallel to the handle grip member 4. A section of the clamping element 9 adjacent the handle grip member 4 is flexed upwardly from the midportion of the clamping element such that the edge portion 9b thereof is engageable with the lock lever 10. Due to the construction described above, when the lock lever 10 is held in the locking position, with the portion 10c arranged substantially parallel to the handle grip member 4, the hook-shaped portion 10a of the lock lever 10 is interposed between the main body 6 and the edge portion 9b of the clamping element 9, depressing the upper surface of the clamping element 9 by the under surface of the hook-shaped portion 10a, i.e. by the cam surface 10b, in abutting relation therewith. The clamping element 9, therefore, makes a pivotal movement about the pin 8 clockwise with respect to FIG. 2 and interlocks with the integral extension 2 of the casserole dish 1.

Figure 3:
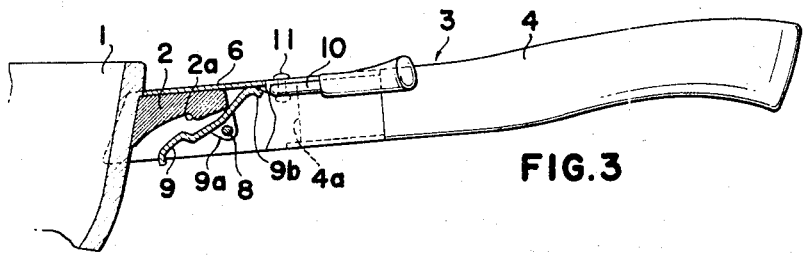
FIGURE 3 is a fragmentary cross sectional view of the handle apparatus in an unlocked position.
Figure 4:
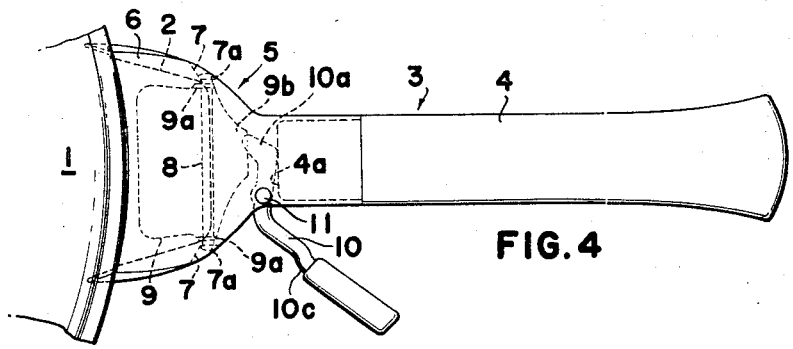
FIGURE 4 is a plan view of FIG. 3.

When the lock lever 10 is in an unlocked position, on the other hand, the end 10a of the lock lever 10 comes off the engagement with the edge portion 9b of the clamping element 9, as shown in FIGS. 3 and 4, thus providing for removal of the handle apparatus 3 from the casserole dish 1. In this position, since the angular portion 10b defining the hook-shaped portion 10a of the lock lever 10 is in contact with the end surface 4a of handle grip member 4, further movement of the portion 10c of the lock lever 10 outwardly of the handle grip member 4 is prevented and this enables the user to effect the locking operation with the same hand in which the handle apparatus 3 is being held. Namely, the construction described above enables the great advantage of single hand operation to be obtained.

Furthermore, since the underside of the main body 6 of the clamping member 5 is open, cleaning of the movable parts in the vicinity of the pivot pins 8 and 11 can be achieved with ease and consequently it is possible to prevent malfunction of the lever 10 and clamping element 9 possibly caused by filth attached thereto.

It should also be noted that according to the present invention, the clamping element may be rendered slightly elastic by means of quenching, so that the desired object can be well achieved even when there is a slight error in the thickness of the integral extension.

What is claimed is:

1. A detachable handle apparatus for connection with an object having an integral extension extending from the side wall thereof, said handle apparatus comprising a handle grip member; a clamping housing open at the bottom, extending over said extension, and fixed to the inner end of said handle grip member; a clamping member connected to said clamping housing for pivotal movement in a vertical plane, one end portion of said clamping member adapted to engage said extension to lock said clamping housing and said handle grip member with respect to said object; and a lock lever connected to said clamping housing in the proximity of said inner end of said handle grip member for pivotal movement in a horizontal plane, said lock lever having a cam surface formed on the inner end portion thereof adapted to engage said clamping member so that when the outer end portion of said lock lever is pivoted towards said handle grip member said cam surface cams the other end portion of said clamping member to bring said one end portion of said clamping member in engagement with said extension, said outer end portion of said lock lever being bent towards said handle grip member, and said inner end portion of said lock lever being shaped so that when said outer end portion of said lock lever is pivoted away from said handle grip member, said inner end portion of said lock lever engages said inner end of said handle grip member to stop said outer end portion of said lock lever at an acute angle with respect to said handle grip member.

2. The apparatus of claim 1, wherein the inner end of said clamping housing has a configuration conforming to the contour of a wall of said object and is in engagement with said wall.

3. The apparatus of claim 1, further comprising a shaft pin extending across both side walls of said clamping housing, said clamping member being pivotal about said pin.

4. The apparatus of claim 1, wherein said lock lever is pivotally connected to the underside of the upper wall of said clamping housing.

5. The apparatus of claim 1, wherein said cam surface is formed on the undersurface of said inner end portion of said lock lever and is sloped upwardly toward the tip end of said inner end portion of said lock lever.

References Cited
UNITED STATES PATENTS

| | | | |
|---|---|---|---|
| 2,229,859 | 1/1941 | McCoy | 294—31 |
| 3,306,647 | 2/1967 | Imhoff | 294—31 |

ANDRES H. NIELSEN, *Primary Examiner.*